(12) United States Patent
Al-Shammary

(10) Patent No.: US 10,041,600 B2
(45) Date of Patent: Aug. 7, 2018

(54) MUD PUMP PRESSURE SWITCH

(71) Applicant: Saudi Arabian Oil Company, Dhahran (SA)

(72) Inventor: Eyadah Al-Ruothy Al-Shammary, Hail (SA)

(73) Assignee: Saudi Arabian Oil Company, Dhahran (SA)

( * ) Notice: Subject to any disclaimer, the term of this patent is extended or adjusted under 35 U.S.C. 154(b) by 500 days.

(21) Appl. No.: 14/021,613

(22) Filed: Sep. 9, 2013

(65) Prior Publication Data

US 2015/0068624 A1    Mar. 12, 2015

(51) Int. Cl.
 F04B 49/22 (2006.01)
 F16K 17/02 (2006.01)
 F04B 47/02 (2006.01)
 F04B 49/02 (2006.01)
 F04B 49/10 (2006.01)

(52) U.S. Cl.
 CPC ............ *F16K 17/02* (2013.01); *F04B 47/02* (2013.01); *F04B 49/02* (2013.01); *F04B 49/022* (2013.01); *F04B 49/10* (2013.01); *F04B 49/22* (2013.01); *Y10T 137/86002* (2015.04)

(58) Field of Classification Search
 CPC .......... F04B 49/00; F04B 49/10; F04B 49/02; F04B 49/22; F04B 2205/04; F04B 2205/05; F04B 2207/70; F04B 2207/703; F15B 2211/55; F15B 2211/865; F15B 2211/87; F15B 2211/8755
 USPC ................................ 417/12, 26, 29, 30, 44.1
 See application file for complete search history.

(56) References Cited

U.S. PATENT DOCUMENTS

| | | | |
|---|---|---|---|
| 3,559,731 A | | 2/1971 | Stafford |
| 3,873,808 A | | 3/1975 | Patton |
| 3,964,556 A | | 6/1976 | Gearhart et al. |
| 4,341,504 A | * | 7/1982 | Hignutt .................. F04B 49/04 417/38 |

(Continued)

FOREIGN PATENT DOCUMENTS

| | | |
|---|---|---|
| CA | 2286872 | 4/2001 |
| WO | 2012134302 | 10/2012 |

OTHER PUBLICATIONS

PCT International Search Report and the Written Opinion; dated May 4, 2015; International Application No. PCT/US2014/053462; International File Date: Aug. 29, 2014.

*Primary Examiner* — Dominick L Plakkoottam
*Assistant Examiner* — Philip Stimpert
(74) *Attorney, Agent, or Firm* — Bracewell LLP; Constance G. Rhebergen; Linda L. Morgan

(57) ABSTRACT

A pressure switch safety system includes a pressure switch for mounting to a mud pumping system. The pressure switch can be moved from a pressure switch open position to a pressure switch closed position when the pressure within the mud pumping system reaches an excess trigger pressure. The excess trigger is greater than the pressure required to activate a pressure relief valve system of the mud pumping system. An alarm and a timer are actuated when the pressure switch is moved from the pressure switch open position to the pressure switch closed position. The timer has a preset time interval. The system has a mud pump shut down control module that will shut down the mud pumping system after the preset time interval has elapsed.

3 Claims, 3 Drawing Sheets

(56) References Cited

U.S. PATENT DOCUMENTS

| | | | |
|---|---|---|---|
| 4,550,747 A | 11/1985 | Woodworth | |
| 4,572,237 A | 2/1986 | Thompson | |
| 4,610,607 A * | 9/1986 | Kruger | B62D 5/062 417/292 |
| 4,678,403 A * | 7/1987 | Rudy | F04B 49/025 307/118 |
| 5,568,825 A | 10/1996 | Faulk | |
| 5,778,990 A | 7/1998 | Niemi | |
| 5,975,129 A | 11/1999 | Williams | |
| 6,357,537 B1 | 3/2002 | Runquist | |
| 6,651,696 B2 | 11/2003 | Hope | |
| 6,766,835 B1 | 7/2004 | Fima | |
| 6,918,407 B2 | 7/2005 | White | |
| 6,939,470 B2 | 9/2005 | Baarman | |
| 8,347,982 B2 | 1/2013 | Hannegan | |
| 8,413,677 B1 | 4/2013 | Coffman | |
| 8,425,302 B2 | 4/2013 | Walls | |
| 8,457,908 B2 | 6/2013 | Patel | |
| 2004/0049322 A1* | 3/2004 | Vanderhoof | F04B 41/02 700/301 |
| 2004/0261855 A1 | 12/2004 | Hart | |
| 2008/0078586 A1 | 4/2008 | Tettleton | |
| 2009/0252620 A1* | 10/2009 | Lazzara | F04B 15/02 417/212 |
| 2011/0030816 A1 | 2/2011 | Kauss | |
| 2011/0114202 A1 | 5/2011 | Goseco | |
| 2012/0031494 A1 | 2/2012 | Lymberopoulos | |
| 2012/0090893 A1 | 4/2012 | Leuchtenberg | |

* cited by examiner

MUD PUMP PRESSURE SWITCH

BACKGROUND

Field of the Invention

The invention relates generally to mud pumping systems and more specifically, to safety mechanisms for pressure relief valves for use with mud pumping systems.

Description of the Related Art

The pressure relief valve in the mud pumping system is designed to relieve the pressure buildup in the mud pumping system and prevent such pressure from reaching unsafe levels. Excessive pressure in mud pumping systems can cause the failure of major system components. The failure of the relief valves in reducing system pressure can cause pressure build up which could result the failure in any weak point in the system and lead to catastrophe high pressure explosions which can damage the equipment and harm individuals in the vicinity.

SUMMARY

In view of the foregoing, embodiments of the present invention provide a safety system and method, should the pressure relief valve fail in maintaining the pressure of the mud pumping system below a specified excess pressure.

In one embodiment of the present invention, a pressure switch safety system includes a pressure switch for mounting to a mud pumping system. The pressure switch can be moved from a pressure switch open position to a pressure switch closed position when the pressure within the mud pumping system reaches an excess trigger pressure. The excess trigger pressure is greater than the pressure required to activate a pressure relief valve system of the mud pumping system. An alarm is in electrical communication with the pressure switch such that the alarm is actuated when the pressure switch is moved from the pressure switch open position to the pressure switch closed position. A timer is also in electrical communication with the pressure switch such that the timer is actuated when the pressure switch is moved from the pressure switch open position to the pressure switch closed position. The timer has a preset time interval. The system also includes a mud pump shut down control module. The shut down control module can be actuated to shut down the mud pumping system after the preset time interval has elapsed.

In certain embodiments, the system can have a reset switch. The reset switch is operable to turn off the alarm if the pressure switch is returned to the pressure switch open position. The reset switch can also turn off the alarm and to turn off the timer if the pressure switch is returned to the pressure switch open position before the time interval has elapsed.

In other embodiments, the system can have a first relay and a plurality of first relay contacts. Each first relay contact is moveable from a first relay normal open position to a first relay closed position when the pressure switch is in the pressure switch closed position. The first relay is operable to actuate the alarm and to actuate the timer.

In yet other embodiments, the system can have a second relay. The second relay has a second relay contact movable from a second relay normal position to a second relay actuated position. The second relay contact actuates the mud pump shut down control module when the second relay is in the second relay actuated position. The timer can have a timer contact in electrical communication with the second relay. The timer contact is moveable from a timer contact normal open position to a timer contact closed position when the time interval has elapsed, causing the second relay contact to move from the second relay normal position to the second relay actuated position.

In another embodiment of the present invention, a pressure switch safety system includes a pressure switch for mounting to a mud pumping system. The pressure switch moves from a pressure switch open position to a pressure switch closed position when the pressure within the mud pumping system reaches an excess trigger pressure. The excess trigger pressure is greater than the pressure required to activate a pressure relief valve system of the mud pumping system. A first relay is in electrical communication with the pressure switch, the first relay having a first contact, a second contact and a third contact. Each of the first relay contacts move from a first relay normal open position to a first relay closed position when the pressure switch is moved to the pressure switch closed position. An alarm is in electrical communication with the first relay. The alarm is actuated when the second contact of the first relay is moved to the first relay closed position. A timer is also in electrical communication with the first relay. The timer is actuated when the third contact of the first relay is moved to the first relay closed position. The timer has a preset time interval.

The system includes a second relay. The second relay has a second relay contact that moves from a second relay normal position to a second relay actuated position when the preset time interval has elapsed. A mud pump shut down control module is in electrical communication with the second relay. The mud pump shut down control module shuts down the mud pumping system when the second relay contact is moved to the second relay actuated position.

In certain embodiments, the system includes a reset switch that has a reset switch normal closed position. The reset switch is in electrical communication with the first contact of the first relay. When the pressure switch is in the pressure switch open position the reset switch can be moved to a reset switch open position to cause the first contact, second contact and third contact of the first relay to each move to the first contact normal open position to turn off the alarm. The reset switch can alternatively be moved to the reset switch open position before the time interval has elapsed to cause the first contact, second contact and third contact of the first relay to each move to the first relay normal open position to turn off the alarm and the timer.

The second relay normal position can be an open position and the second relay actuated position can be a closed position. Alternatively, the second relay normal position can be a closed position and the second relay actuated position can be an open position.

In yet other embodiments of the current invention, a mud pumping system includes a mud pump for pumping drilling fluids into a subterranean well and a pressure relief valve for relieving pressure within the mud pumping system when pressure within the mud pumping system exceeds a predetermined pressure. The system includes a pressure switch. The pressure switch moves from a pressure switch open position to a pressure switch closed position when the pressure within the mud pumping system reaches an excess trigger pressure. The excess trigger pressure is greater than the pressure relief valve predetermined pressure. The system includes an alarm. The alarm is actuated when the pressure switch is moved from the pressure switch open position to the pressure switch closed position. The system also includes a timer. The timer is actuated when the pressure switch is moved from the pressure switch open position to the pressure switch closed position. The timer has a preset time interval. The system also has a mud pump shut down control module. The mud pump shut down control module shuts down the mud pumping system after the preset time interval has elapsed.

In certain embodiments, the system has a reset switch. The reset switch can turn off the alarm if the pressure switch is returned to the pressure switch open position. Alternatively, the reset switch can turn off the alarm and turn off the timer if the pressure switch is returned to the pressure switch open position before the time interval has elapsed.

In other embodiments, the system has a first relay. The first relay has a first contact, a second contact and a third contact. Each first relay contact moves from a first relay normal open position to a first relay closed position when the pressure switch is moved to the pressure switch closed position. The system can have a reset switch in electrical communication with the first contact of the first relay. The reset switch causes each of the first contact, second contact and third contact of the first relay to move to the first relay normal open position after the pressure switch is moved from the pressure switch closed position to the pressure switch open position and the reset switch is moved from a reset switch normal closed position to a reset switch open position. The timer is in electrical communication with the second contact of the first relay and actuated when the second contact of the first relay moves to the first relay closed position. The alarm is in electrical communication with the third contact of the first relay and actuated when the third contact of the first relay moves to the first relay closed position.

In yet other embodiments the system can have a second relay. The second relay has a second relay contact movable from a second relay normal position to a second relay actuated position. The second relay actuates the mud pump shut down control module when the second relay is in the second relay actuated position. The timer can have a timer contact in electrical communication with the second relay. The timer contact is moveable from a timer contact normal open position to a timer contact closed position when the time interval has elapsed, causing the second relay contact to move from the second relay normal position to the second relay actuated position.

BRIEF DESCRIPTION OF DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION

Figure 1:
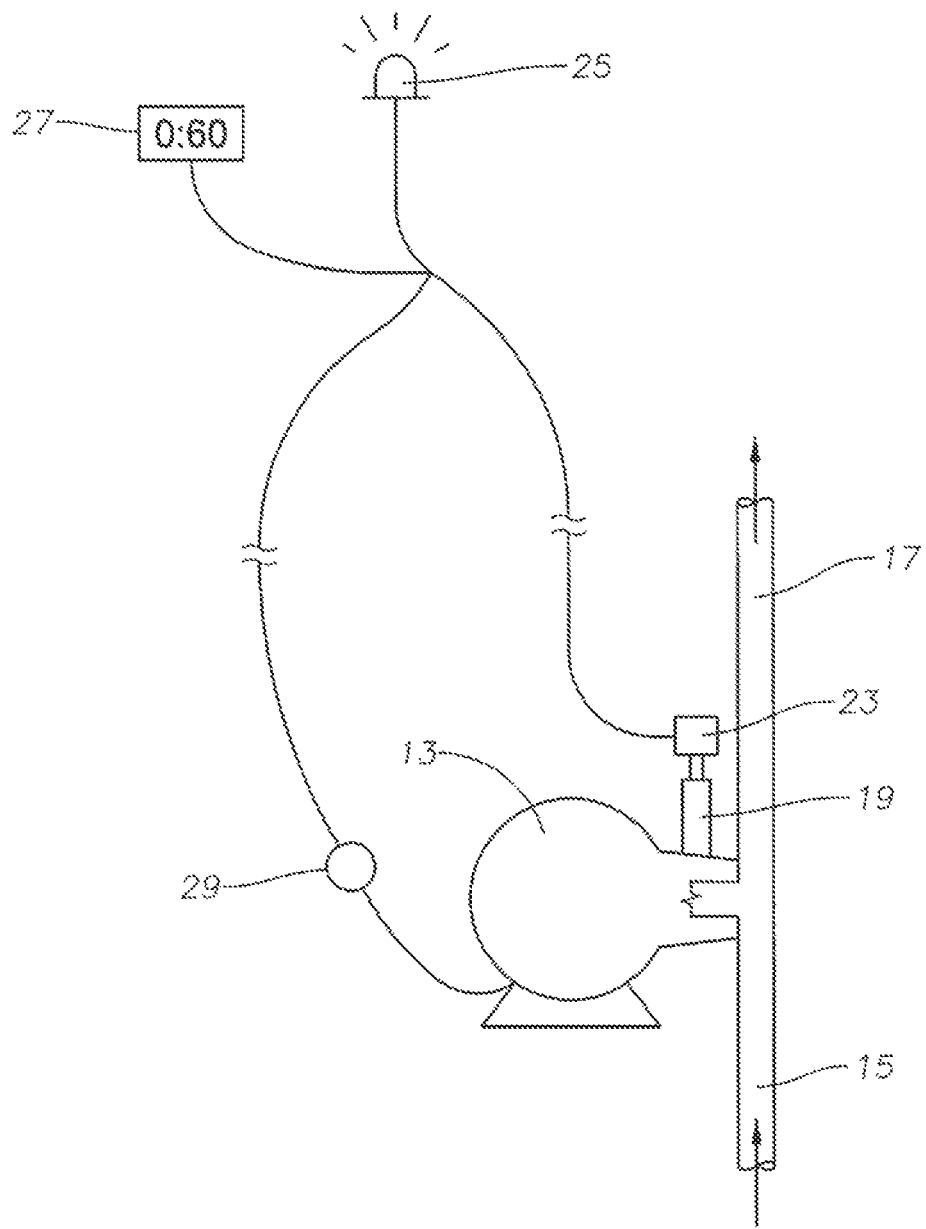
FIG. 1 is a schematic drawing of an embodiment of a mud pumping system in accordance with this disclosure.

Turning to FIG. 1, mud pumping system 11 includes a high pressure mud pump 13. The mud pumping system 11 draws mud and other related drilling fluids from the mud pits, or other source, through an intake pipe 15 and discharges the fluids through a discharge pipe 17. The discharge pipe 17 delivers the fluids to a wellhead assembly for injection into a well.

The pumping system 11 includes a pressure relief valve 19. The pressure relief valve 19 is shown connected to the mud pump 13 but may alternatively be connected to the discharge pipe 17. The pressure relief valve 19 is designed to prevent excessive pressure in the mud pumping system 11. However, there may be times when the pressure relief valve 19 fails to prevent the over-pressurization of pumping system 11.

Figure 2:
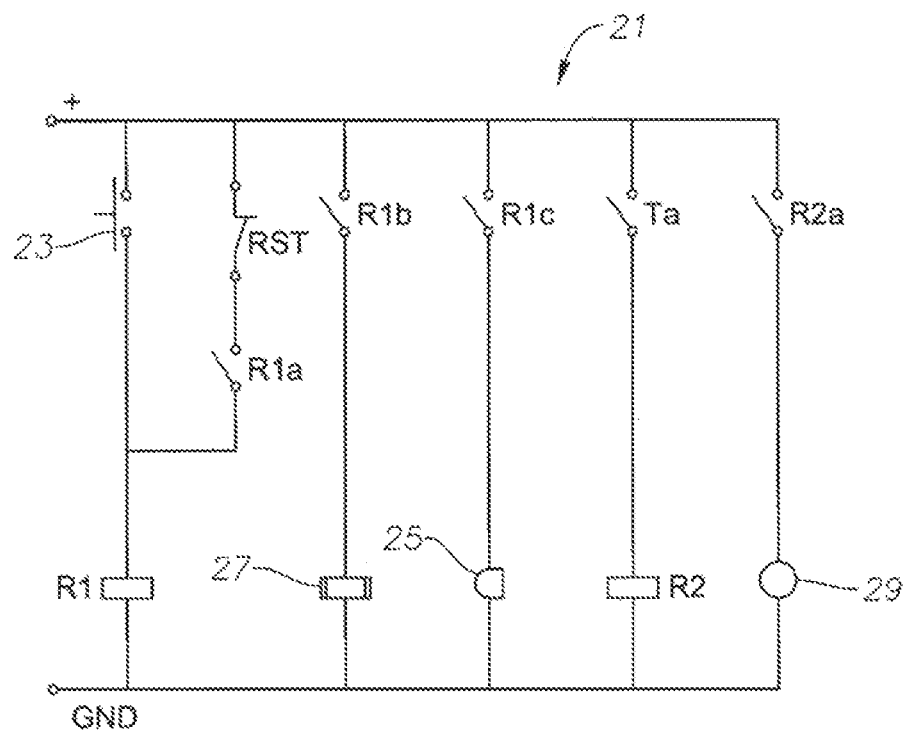
FIG. 2 is a schematic drawing of an embodiment of a mud pump pressure switch electrical circuit, with the pressure switch not triggered, in accordance with this disclosure.

A pressure switch safety system 21 in FIG. 2 can be mounted to the pressure relief valve 19. Alternatively, the pressure switch safety system 21 can be mounted to the discharge pipe 17 or any other convenient location along the mud pumping system 11 where pressure within the mud pumping system 11 can be measured. Pressure switch safety system 21 includes a pressure switch 23. Pressure switch 23 is electrically connected to an alarm 25, a timer 27, and a mud pump shutdown control module 29.

Turning to FIG. 2, a simplified schematic electrical diagram of an embodiment of the pressure switch safety system 21 includes the pressure switch 23. Pressure switch 23 can be set to be triggered if pressure within mud pumping system 11 reaches a certain excess trigger pressure. The excess trigger pressure is greater than the pressure at which pressure relief valve 19 is designed to relieve pressure. For example, pressure switch 23 can be set to be triggered if the pressure within mud pumping system is 50-200 psi, or in a more specific example 100 psi, higher than the pressure at which the pressure relief valve was designed to relieve pressure from the mud pumping system.

Figure 3:
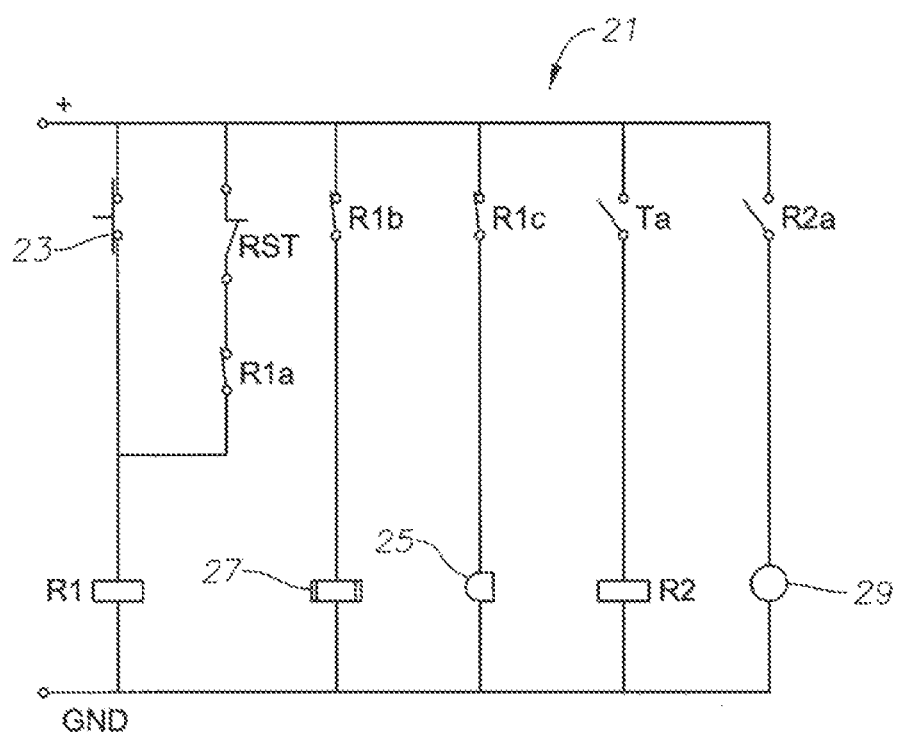
FIG. 3 is a schematic drawing of an embodiment of a mud pump pressure switch electrical circuit, with the pressure switch triggered and before the time interval of the timer has elapsed, in accordance with this disclosure.

Looking at FIG. 3, if pressure switch 23 is triggered and moved to the pressure switch closed position, power from a power supply + will flow through the pressure switch 23 and reach the first relay R1, actuating the first relay R1, and return to a ground GND. Relay R1 can have a first contact R1a, a second contact R1b, and a third contact R1c. Each contact R1a, R1b, and R1c of the first relay R1 will move from a first relay normal open position to a first relay closed position when power is supplied to the first relay R1. First contact R1a of first relay R1 is located in series with a reset switch RST and located in parallel with pressure switch 23. Moving first contact R1a of first relay R1 to the first relay closed position will provide an alternative parallel power circuit to the first relay R1 so that if pressure switch 23 is returned to the pressure switch open position, the first relay contacts R1a, R1b and R1c will remain in the first relay closed position until the reset switch RST is moved to a reset switch open position.

Third contact R1c of the first relay R1 is located in series with alarm 25. With the first contact R1c of the first relay R1 in the first relay closed position, power is supplied to alarm 25 to actuate alarm 25. Alarm 25 can be audial or visual or both. Alarm 25 will function to warn the personnel, such as those on the rig floor and in particular, the driller, that the excess trigger pressure of the mud pumping system 11 has been reached and that the pressure relief valve 19 has failed to properly relieve such excess pressure. Personnel will then have to act within the preset time interval of timer 27, or the mud pumping system 11 will be automatically shut down as discussed herein.

Figure 4:
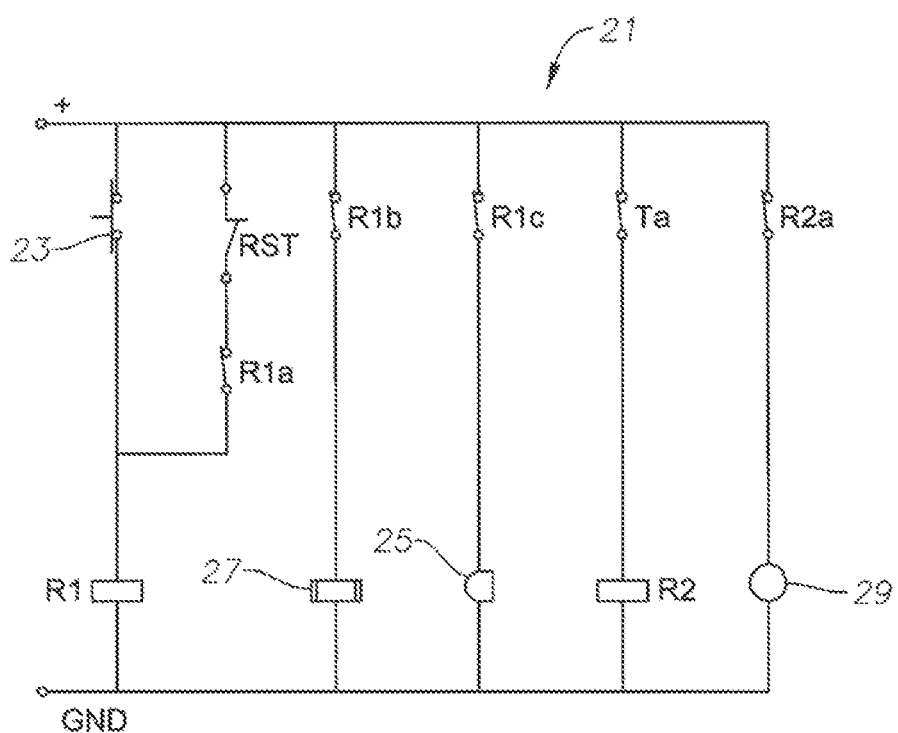
FIG. 4 is a schematic drawing of an embodiment of a mud pump pressure switch electrical circuit, with the pressure switch triggered and after the time interval has elapsed, in accordance with this disclosure.

Second contact R1*b* of first relay R1 is located in series with timer 27. With the second contact R1*b* of first relay R1 in the first relay closed position, power is supplied to timer 27 to actuate timer 27. Timer 27 has a preset time interval, such as 10-15 seconds. After such time interval has elapsed, if the pressure switch safety system 21 has not been reset, timer contact Ta will move from a timer contact normal open position to a timer contact closed position. Moving timer contact Ta to a timer contact closed position will cause power to be provided to the second relay R2 to actuate second relay R2. Second relay R2 has a second relay contact R2*a* which has a second relay normal position and a second relay actuated position. The second relay normal position of second relay contact R2*a* can be either open or closed. In either case, when power is supplied to the second relay R2, the mud pump shutdown control module 29 will be actuated and shut down the mud pumping system 11. In the embodiment of FIG. 4, the second relay normal position of second relay contact R2*a* is open and when power is supplied to the second relay R2, second relay contact R2*a* will close and the mud pump shut down control module 29 will be powered and cause the mud pumping system 11 to shut down. Alternatively, if the second relay normal position of second relay contact R2*a* is closed, when power is supplied to the second relay R2, second relay contact R2*a* will open and power to the mud pump shut down control module 29 is interrupted causing mud pumping system 11 to shut down.

After the pressure in the mud pumping system 11 drops below the excess trigger pressure, the pressure switch 23 will return to the pressure switch open position. Pressure switch safety system 21 can then be reset by moving the reset switch RST from the reset switch normal closed position to the pressure switch open position. This can be accomplished, for example, by pushing a reset button. Moving the reset switch RST to the reset switch open position will cut the power to the first relay R1 which will cause the first relay contacts R1*a*, R1*b*, R1*c* to move back to the first relay normal open position. With second contact R1*b* of first relay R1 in the first relay normal open position and no power being provided to timer 27, timer contact Ta will move from the timer contact closed position to the timer contact normal open position. This will result in a loss of power being provided to the second relay and the second relay contact R2*a* will return to the second relay normal position. Therefore after resetting the pressure switch safety system 21, the pressure switch safety system 21 will return to its normal, un-triggered condition of FIG. 2.

In operation, looking at FIGS. 1-2, mud pumping system 11 circulates drilling fluids at high pressure into a subterranean wellbore during hydrocarbon field development. If the pressure within the mud pumping system 11 reaches a predetermined level, the pressure relief valve 19 is meant to relieve the pressure within the mud pumping system 11 so that the pressure within the mud pumping system 11 decreases to a value below such predetermined level. However, if the pressure within the mud pumping system 11 continues to rise and reaches the excess trigger pressure of pressure switch 23, pressure switch 23 will be triggered. This could happen if the pressure relief valve a fails to reduce pressure in the mud pumping system 11.

Turning to FIG. 3, once the pressure switch 23 has been triggered, the alarm 25 and the timer 27 will be activated. This can be accomplished by pressure switch 23 activating the first relay R1, which in turn causes the second and third contacts R1*b*, R1*c* of first relay R1 to move to the first relay closed position. If the operator does not act within the preset time interval of timer 27, the mud pumping system 11 will be shut down. This can be accomplished, for example, by timer contact Ta moving to the timer contact closed position when the time interval of timer 27 has elapsed.

With the time interval of timer 27 having elapsed, the mud pumping system 11 will be shut down. This can happen by the movement of timer contact Ta to the tinier contact closed position, actuating the second relay R2. Turning to FIG. 4, second relay contact R2*a* can then move to the second relay actuated position and activate mud pump shut down module 29. Mud pump shut down module 29 can be as simple as a kill switch which interrupts the power supply to mud pump 13. In this manner, the pressure switch safety system 21 will automatically shut down the mud pumping system if the pressure within the mud pumping system 11 reaches the excess trigger pressure and the operator does not reset the pressure switch safety system 11 within the time interval of timer 27.

After the mud pumping system 11 has been shut down, the pressure in mud pumping system 11 can be relieved. This will cause the pressure switch 23 to return to the pressure switch open position. The operator may then reset the pressure switch safety system 21, for example by moving the reset switch RST to the reset switch open position. This will cause the first relay contact R1*a* to return to the first relay normal open position, turn off the alarm 25, and return the pressure switch safety system 21 to its normal pre-triggered condition of FIG. 2.

Returning to FIG. 3, if the operator is able to reduce the pressure within the mud pumping system 11 before the time interval of timer 27 has elapsed, the pressure switch 23 will return to the pressure switch open position and the operator can reset the pressure switch safety system 21, for example by moving the reset switch RST to the reset switch open position. This will stop the alarm 25 and the timer 27 and return the pressure switch safety system 21 to its normal pre-triggered condition of FIG. 2, without the pressure switch safety system 21 having shut down the mud pumping system 11.

FIGS. 2-4 illustrate one possible configuration of the circuitry of pressure switch safety system 21. Other configurations are possible which will result in the operational process as described herein. While the invention has been shown in only a few of its forms, it should be apparent to those skilled in the art that it is not so limited but susceptible to various changes without departing from the scope of the invention. Accordingly, it is intended to embrace all such alternatives, modifications, and variations as fall within the spirit and broad scope of the appended claims.

Those skilled in the art will recognize that many changes and modifications can be made to the method of practicing the invention without departing the scope and spirit of the invention. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification. Furthermore, language referring to order, such as first and second, should be understood in an exemplary sense and not in a limiting sense. For example, it may be recognized by those skilled in the art that certain steps can be combined into a single step.

What is claimed is:

1. A pressure switch safety system comprising:
a pressure relief valve system with a pressure relief valve of the pressure switch safety system, the pressure relief valve system operable to relieve a pressure of a mud pumping system when the pressure of the mud pumping system reaches a predetermined level of pressure required to activate the pressure relief valve system of the mud pumping system;
a pressure switch for mounting to the mud pumping system, the pressure switch operable to be moved from a pressure switch open position to a pressure switch closed position when the pressure relief valve fails to relieve the pressure of the mud pumping system and the pressure of the mud pumping system reaches an excess trigger pressure, such excess trigger pressure being greater than the predetermined level of pressure required to activate the pressure relief valve system of the mud pumping system;
a first relay in electrical communication with the pressure switch, the first relay having a first contact, a second and a third contact, each first relay contact configured to move from a first relay normal open position to a first relay closed position when the pressure switch is moved to the pressure switch closed position,
an alarm configured to be actuated when the second contact of the first relay is moved to the first relay closed position;
a timer configured to be actuated when the third contact of the first relay is moved to the first relay closed position, the timer having a preset time interval, wherein the timer moves to a timer closed position when the preset time interval has elapsed;
a second relay, the second relay having a second relay contact configured to move from a second relay normal position to a second relay actuated position when the preset time interval has elapsed and power is provided to the second relay when the timer is in a timer closed position;
a mud pump shut down control module configured to automatically shut down the mud pumping system absent operator intervention when the second relay contact is moved to the second relay actuated position; and
a reset switch having a reset switch normal closed position and located in series with the first contact, the rest switch configured such that when the pressure switch is in the pressure switch open position the reset switch can be moved to a reset switch open position to cause the first contact, second contact and third contact of the first relay to each move to the first contact normal open position, stopping both the timer and the alarm; wherein
the reset switch is located in parallel with the pressure switch such that after moving the reset switch to the reset switch open position if the pressure switch remains in the pressure switch closed position will not stop the alarm or timer.

2. The system of claim 1, wherein the second relay normal position is an open position and the second relay actuated position is a closed position.

3. The system of claim 1, wherein the second relay normal position is a closed position and the second relay actuated position is an open position.

* * * * *